(12) United States Patent
Okamoto et al.

(10) Patent No.: US 12,241,562 B2
(45) Date of Patent: Mar. 4, 2025

(54) VALVE DEVICE

(71) Applicant: KAWASAKI JUKOGYO KABUSHIKI KAISHA, Kobe (JP)

(72) Inventors: Masayoshi Okamoto, Kobe (JP); Makoto Ninomiya, Kobe (JP); Yutaka Suzuki, Kobe (JP); Ryo Miyoshi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 47 days.

(21) Appl. No.: 17/920,185

(22) PCT Filed: Apr. 20, 2021

(86) PCT No.: PCT/JP2021/016010
§ 371 (c)(1),
(2) Date: Oct. 20, 2022

(87) PCT Pub. No.: WO2021/220880
PCT Pub. Date: Nov. 4, 2021

(65) Prior Publication Data
US 2023/0160490 A1    May 25, 2023

(30) Foreign Application Priority Data

Apr. 27, 2020    (JP) ................ 2020-078571

(51) Int. Cl.
| *F16K 27/02* | (2006.01) |
| *F16K 27/12* | (2006.01) |
| *F16K 31/06* | (2006.01) |

(52) U.S. Cl.
CPC ............ *F16K 27/12* (2013.01); *F16K 27/029* (2013.01); *F16K 31/0655* (2013.01)

(58) Field of Classification Search
CPC ...... F16K 27/12; F16K 27/029; F16K 27/048; F16K 31/0655; F16K 39/024; F25B 2341/067; H01R 13/639; H01R 13/506
(Continued)

(56) References Cited

U.S. PATENT DOCUMENTS

| 1,781,453 A | * | 11/1930 | Frame | ................ | F23N 5/20 |
| | | | | | 236/1 G |
| 2,181,717 A | * | 11/1939 | Wood | ................ | B60T 8/26 |
| | | | | | 251/129.02 |

(Continued)

FOREIGN PATENT DOCUMENTS

| JP | H09068287 A | 3/1997 |
| JP | 2003232460 A | 8/2003 |
| JP | 5421059 B2 | 2/2014 |

*Primary Examiner* — Craig J Price
(74) *Attorney, Agent, or Firm* — Alleman Hall & Tuttle LLP

(57) ABSTRACT

A valve device includes a valve block having a valve port through which a fluid passes and an insertion hole; a moving valve body that opens or closes the valve port; a guide member that is inserted in the insertion hole, and slidably guides the valve body; a solenoid that generates a magnetic field when energized; a stationary pole that cooperates with the solenoid to move the valve body; a tubular support member that is inserted in the insertion hole to accommodate the solenoid, and supports the guide member that receives pressure from the fluid passing through the valve port; and a lid member that closes an opening of the support member, and the support member is joined with the valve block.

6 Claims, 4 Drawing Sheets

(58) Field of Classification Search
USPC .................................. 251/129.01–129.22
See application file for complete search history.

(56) References Cited

U.S. PATENT DOCUMENTS

| | | | | |
|---|---|---|---|---|
| 2,297,626 A * | 9/1942 | Lennholm | ............ | H01F 7/1607 335/251 |
| RE25,338 E * | 2/1963 | Oslon | .................. | F16K 31/408 251/30.04 |
| 3,377,046 A * | 4/1968 | Frantz | ................ | F16K 31/0606 29/605 |
| 3,458,769 A * | 7/1969 | Stamfli | ................ | F16K 31/082 251/30.01 |
| 3,670,274 A * | 6/1972 | Ellison | ............... | F16K 31/0627 335/278 |
| 3,670,768 A * | 6/1972 | Griswold | ................ | F16K 17/00 222/144.5 |
| 3,865,140 A * | 2/1975 | Greenwood | ........ | F15B 13/0405 137/625.65 |
| 3,903,919 A * | 9/1975 | Zeuner | ................. | F16K 31/406 251/44 |
| 3,952,774 A * | 4/1976 | Loveless | ............. | F16K 31/0634 137/625.5 |
| 4,050,477 A * | 9/1977 | Acar | ..................... | F16K 11/056 137/625.65 |
| 4,387,739 A * | 6/1983 | Schaming | ........... | F15B 13/0814 137/884 |
| 4,720,078 A * | 1/1988 | Nakamura | .......... | F16K 31/0606 251/129.21 |
| 4,790,351 A * | 12/1988 | Kervagoret | ........... | H01F 7/1607 251/117 |
| 4,936,543 A * | 6/1990 | Kamibayasi | ........ | F16K 31/0658 251/121 |
| 5,135,027 A * | 8/1992 | Miki | ................... | F16K 31/637 137/596.17 |
| 5,192,936 A * | 3/1993 | Neff | ...................... | H01F 7/1607 335/263 |
| 5,263,647 A * | 11/1993 | Cerny | .................. | F02M 51/061 239/DIG. 19 |
| 5,441,233 A * | 8/1995 | Asou | ................... | F16K 31/0655 137/625.65 |
| 5,673,980 A * | 10/1997 | Schwarz | ............... | B60T 8/4872 251/117 |
| 5,718,264 A * | 2/1998 | Sturman | ............... | F16K 31/082 137/625.65 |
| 5,735,582 A * | 4/1998 | Eith | ....................... | B60T 8/4872 251/30.01 |
| 5,836,230 A * | 11/1998 | Sturman | ............ | F15B 13/0405 91/455 |
| 5,878,647 A * | 3/1999 | Wilke | ................... | F16K 31/408 137/596.1 |
| 6,109,298 A * | 8/2000 | Kaneko | ............... | F15B 13/0828 137/884 |
| 6,129,115 A * | 10/2000 | Janssen | ................. | F16K 31/082 137/625.65 |
| 6,209,970 B1 * | 4/2001 | Kamiya | ............... | B60T 15/028 303/119.2 |
| 6,543,481 B2 * | 4/2003 | Neff | .................... | F15B 13/0403 137/625.63 |
| 6,748,976 B2 * | 6/2004 | Sato | ......................... | F16K 24/04 137/625.65 |
| 6,772,791 B2 * | 8/2004 | Neff | .................... | F16K 31/0634 137/906 |
| 6,840,273 B2 * | 1/2005 | Miyazoe | ............. | F15B 13/0402 137/554 |
| 6,854,707 B2 * | 2/2005 | Miyazoe | ................ | H01F 5/04 137/551 |
| 6,959,910 B2 * | 11/2005 | Matsumoto | ......... | F16K 31/0627 251/129.03 |
| 7,004,450 B2 * | 2/2006 | Yoshimura | ............. | H01F 7/081 335/278 |
| 7,048,002 B2 * | 5/2006 | Hayashi | ............. | F15B 13/0857 137/884 |
| 7,178,704 B2 * | 2/2007 | Saidman | ............... | B05C 5/0225 251/129.09 |
| 7,204,473 B2 * | 4/2007 | Yoshimura | .......... | F16K 31/0655 335/297 |
| 7,273,206 B2 * | 9/2007 | Sato | .................... | F16K 31/0627 335/297 |
| 7,753,076 B2 * | 7/2010 | Mita | ....................... | H01R 24/66 439/465 |
| 7,810,518 B2 * | 10/2010 | Cosgrove | ................ | F16K 27/12 137/596.17 |
| 7,954,786 B2 * | 6/2011 | Narita | ................... | F16K 31/0627 310/71 |
| 7,987,871 B2 * | 8/2011 | Cho | .................... | F16K 31/0627 251/282 |
| 8,167,000 B2 * | 5/2012 | Neff | .................... | F16K 31/0627 137/625.69 |
| 8,245,730 B2 * | 8/2012 | Nomichi | ............. | F16K 31/0606 251/129.01 |
| 8,413,951 B2 * | 4/2013 | Nomichi | ............. | F16K 37/005 251/129.1 |
| 8,662,471 B2 * | 3/2014 | Ohmi | .................. | F16K 31/0675 251/129.15 |
| 8,684,036 B1 * | 4/2014 | Satoda | .................... | F16K 27/029 137/625.33 |
| 9,046,189 B2 | 6/2015 | Watanabe | | |
| 9,074,699 B2 * | 7/2015 | Jamison | ................ | F16K 27/029 |
| 9,929,417 B2 * | 3/2018 | Nakamura | ........ | H01M 8/04089 |
| 10,006,559 B2 * | 6/2018 | Kubo | .................... | F16K 31/408 |
| 11,248,715 B1 * | 2/2022 | Janssen | ................ | F16K 39/022 |
| 11,603,946 B2 * | 3/2023 | Nakanishi | ........... | F16K 31/0675 |
| 11,703,142 B2 * | 7/2023 | Nakanishi | ............. | F16K 27/029 251/129.15 |
| 11,721,465 B2 * | 8/2023 | Tresso | .................. | H01F 7/1607 335/257 |
| 11,745,703 B2 * | 9/2023 | Krishnan | ............ | F16K 31/0658 251/129.15 |
| 11,754,197 B2 * | 9/2023 | Okamoto | ................ | F16K 1/523 251/129.15 |
| 11,821,539 B2 * | 11/2023 | Okamoto | ............ | F16K 31/0675 |
| 2008/0308759 A1 * | 12/2008 | Narita | ................. | F16K 31/0627 251/129.15 |
| 2013/0134337 A1 * | 5/2013 | Stucchi | ................ | F16K 31/624 251/129.15 |
| 2019/0085996 A1 | 3/2019 | Chen et al. | | |
| 2019/0093786 A1 | 3/2019 | Landacre | | |
| 2023/0343499 A1 * | 10/2023 | Iida | ......................... | F16F 9/463 |
| 2024/0125405 A1 * | 4/2024 | Kawato | ................ | F16K 27/048 |

* cited by examiner

VALVE DEVICE

TECHNICAL FIELD

The present invention relates to a valve device capable of opening or closing a valve port.

BACKGROUND ART

As a valve device, for example, an electromagnetic valve as in PTL 1 has been known. The electromagnetic valve of PTL 1 includes a valve main element having an insertion hole. The insertion hole accommodates a valve body, a moving core, a coil, and a stationary core. In the electromagnetic valve configured in this manner, the moving core is attracted to the stationary core when the coil is energized. Thus, the valve body separates from the valve port and the valve port opens.

CITATION LIST

Patent Literature

PTL 1: Japanese Patent Publication No. 5421059

SUMMARY OF INVENTION

Technical Problem

In the electromagnetic valve of PTL 1, a lid member is put over the opening of the insertion hole, and the lid member is fastened to the valve main element by a bolt. Since it is necessary to form a bolt hole in the lid member, the outer shape of the lid member increases. That is, the outer shape of the valve device increases.

In light of the above, it is an object of the present invention to provide a valve device of which outer shape can be made smaller.

Solution to Problem

A valve device of the present invention includes a valve block having a valve port through which a fluid passes and an insertion hole; a valve body that opens or closes the valve port; a guide member that is inserted in the insertion hole, and slidably guides the valve body; a solenoid that generates a magnetic field when energized; a stationary pole that cooperates with the solenoid to move the valve body; a tubular support member inserted in the insertion hole to accommodate the solenoid, and supports the guide member that receives pressure from the fluid passing through the valve port; and a lid member that closes an opening of the support member, and the support member is joined with the valve block.

According to the present invention, since there is no need to form a bolt hole for attaching the lid member to the valve block, it is possible to miniaturize the valve block, that is, it is possible to miniaturize the valve device.

Advantageous Effects of Invention

According to the present invention, it is possible to miniaturize the outer shape.

The above objects, other objects, features, and merits of the present invention will be apparent from the detailed description of the following preferred embodiments by reference to attached drawings.

DESCRIPTION OF EMBODIMENTS

Hereinafter, valve devices 1, 1A of Embodiment 1 and Embodiment 2 according to the present invention are described by referring to the aforementioned drawings. The concept of the direction used in the following description is merely used for convenience in description, and should not be understood to limit the orientation or the like of the configuration of the invention to the described direction. The valve device 1 described below is merely one embodiment of the present invention. Therefore, the present invention is not limited to the embodiments, but addition, deletion, and modification can be made without departing from the scope of the invention.

Embodiment 1

Figure 1:
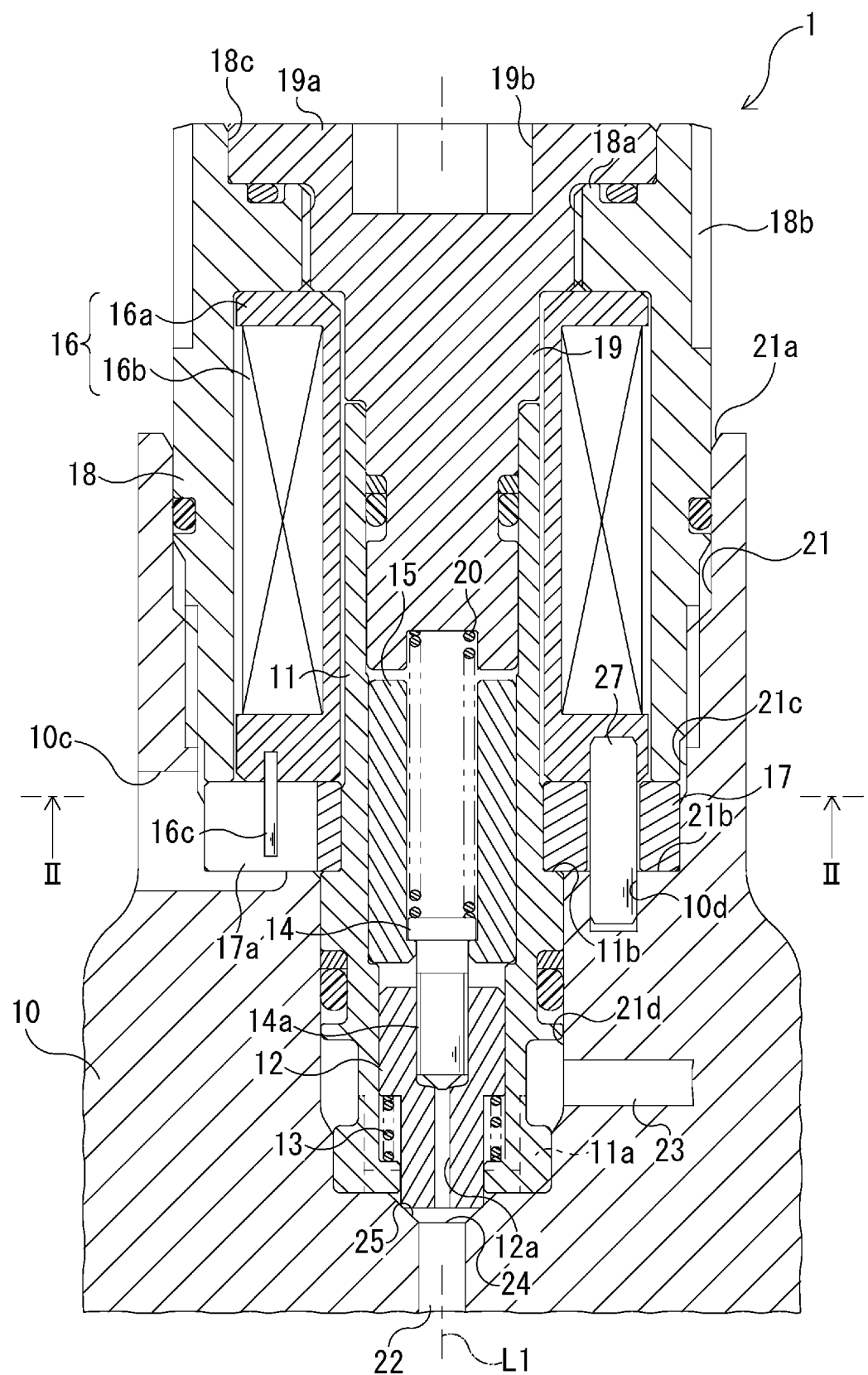
FIG. 1 is a sectional view showing a valve device of Embodiment 1 of the present invention.

The valve device 1 of Embodiment 1 shown in FIG. 1 is included in a tank valve that is provided for a pressure container such as a high-pressure tank. The valve device 1 controls charging and discharging of the fluid stored in the high-pressure tank. The valve device 1 is not limited to the one included in a tank valve as long as it is provided in a fluid flow channel. In the present embodiment, the fluid that is charged and discharged to/from inside the high-pressure tank is gas. To be more specific about the valve device 1, the valve device 1 is an electromagnetic valve device, and is capable of opening a passage of the tank valve by energization. In the present embodiment, the valve device 1 is a pilot-type electromagnetic valve device. The valve device 1 includes a valve block 10, a guide member 11, a main body 12, a first spring member 13, a seat piston 14, a plunger 15, a second spring member 20, a solenoid 16, a magnetic member 17, a casing 18, and a stationary pole 19.

The valve block 10 is a block for mounting various configurations described above. The valve block 10 is formed with a passage for charging gas into the high-pressure tank, and discharging gas in the high-pressure tank. More specifically, the valve block 10 is formed with an insertion hole 21, a first passage 22, and a second passage 23. The insertion hole 21 extends along a predetermined axial line L1 in the valve block 10. The insertion hole 21 has an opening 21a on one side of the axial direction. Also, the insertion hole 21 has a step part 21b in an intermediate part of the axial direction. In the insertion hole 21, a large-diameter part 21c located closer to one side of the axial direction (namely, the opening 21a side) than the step part 21b has a larger diameter than a small-diameter part 21d located on the other side of the axial direction (namely, the bottom side). The first passage 22 extends along the predetermined axial line L1. The first passage 22 connects with the insertion hole 21 via a valve port 24. The second passage 23 extends in the direction perpendicular to the axial line L1.

The second passage 23 connects with the small-diameter part 21*d*. The first passage 22 and the second passage 23 connect with each other via the valve port 24 and the insertion hole 21. In the valve block 10, a valve seat 25 is formed around the valve port 24.

The guide member 11 is capable of slidably guiding the main valve body 12 and the plunger 15. More specifically, the guide member 11 is a tubular member made of metal. The guide member 11 is inserted in the insertion hole 21. That is, the guide member 11 is inserted in the state that the part on the other side of the axial direction is sealed to the small-diameter part 21*d*, and the part on one side of the axial direction projects to the large-diameter part 21*c* from the small-diameter part 21*d*. Also, the guide member 11 strikes the end surface on the other side of the axial direction to the bottom part of the insertion hole 21, and surrounds the valve port 24. Further, in the end part on the other side of the axial direction of the guide member 11, a plurality of guide flow channels 11*a* connecting the first passage 22 and the second passage 23 are formed. Also, the guide member 11 has an engaging part 11*b* in an intermediate part of the axial direction. In the guide member 11, the part closer to the other side of the axial direction than the engaging part 11*b* is formed to have a smaller diameter than the part on one side of the axial direction.

The main valve body 12 is inserted in the guide member 11 in a slidable manner, and moves to open or close the valve port 24. More specifically, the main valve body 12 is formed into a bottomed tubular shape, and a pilot passage 12*a* is formed along the axial line of the main valve body 12. The main valve body 12 is inserted in the guide member 11 in a slidable manner along the axial line L1. The main valve body 12 moves between a closed position where the distal end is seated on the valve seat 25, and an open position where the distal end is separated from the valve seat 25. As the valve port 24 is opened by the main valve body 12, the gas flows from the first passage 22 to the second passage 23. Also, the main valve body 12 is biased by the first spring member 13 mounted outside the main valve body 12 in the direction separating from the valve seat 25 (opening direction).

The seat piston 14 moves to open or close the pilot passage 12*a*. More specifically, the seat piston 14 is formed into a circular columnar shape. The seat piston 14 is inserted in the main valve body 12 in a slidable manner. A distal end part of the seat piston 14 is seated on the main valve body 12. As a result, the pilot passage 12*a* is closed. Also, the seat piston 14 is capable of moving to separate from the pilot passage 12*a*. As a result, the pilot passage 12*a* is opened. On the lateral face of the seat piston 14, a plurality of grooves 14*a* are formed. By the plurality of grooves 14*a*, the space formed on one side of the axial direction of the main valve body 12, and the first passage 22 communicate with each other.

The plunger 15 moves the main valve body 12 to the open position and the closed position depending on the energization state of the solenoid 16. More specifically, the plunger 15 is a cylindrical member containing a magnetic material. The plunger 15 is inserted in the guide member 11 on one side of the axial direction of the main valve body 12 in a slidable manner. Also, in the plunger 15, the seat piston 14 is inserted in such a manner that the part on one side of the axial direction is projected from the plunger 15 and the part on the other side of the axial direction is engaged with the plunger 15. Therefore, as the plunger 15 moves to one side of the axial direction, the seat piston 14 is lifted up. In this manner, the seat piston 14 can be separated from the pilot passage 12*a*.

The second spring member 20 which is a biasing member exerts a biasing force to the main valve body 12 to push the main valve body 12 against the valve seat 25. In the present embodiment, the second spring member 20 pushes the seat piston 14 against the main valve body 12 to seat the seat piston 14 on the main valve body 12. Further, the second spring member 20 biases the main valve body 12 via the seat piston 14 to be seated in order to seat the main valve body 12 on the valve seat 25. In the present embodiment, the second spring member 20 is a compression coil spring. The second spring member 20 is inserted in the plunger 15 in the state that the end part on the other side of the axial direction is in contact with the seat piston 14 and compressed. As a result, the seat piston 14 is pushed against the plunger 15. Also, the second spring member 20 pushes the seat piston 14 in a seated state against the main valve body 12.

The solenoid 16 generates a magnetic field when it is energized. The solenoid 16 is formed into a cylindrical shape. More specifically, the solenoid 16 is configured by winding a coil 16*b* around a cylindrical coil bobbin 16*a*. The solenoid 16 is arranged in the large-diameter part 21*c* of the insertion hole 21. The solenoid 16 is mounted outside the guide member 11. The part on one side of the axial direction of the solenoid 16 projects from the insertion hole 21 toward one side of the axial direction. That is, the solenoid 16 projects from the valve block 10 toward one side of the axial direction. Further, the solenoid 16 has a terminal 16*c* for energizing the coil 16*b*. The terminal 16*c* projects from the other end part of the solenoid 16 toward the other side of the axial direction.

The magnetic member 17, together with the solenoid 16, constitutes a magnetic circuit. More specifically, the magnetic member 17 is formed into an annular shape. In the present embodiment, the magnetic member 17 is a yoke. The magnetic member 17 is formed to have a larger diameter than the solenoid 16. The magnetic member 17 is mounted outside the guide member 11, and arranged in the large-diameter part 21*c* of the insertion hole 21. There may be a clearance between the magnetic member 17 and the guide member 11. More specifically, the magnetic member 17 is arranged in correspondence with the small-diameter part of the guide member 11. Also, the magnetic member 17 is interposed between the solenoid 16 and the step part 21*b* in the insertion hole 21. In the present embodiment, the magnetic member 17 is formed integrally with coil bobbin 16*a* of the solenoid 16. Also, an inner edge part of the magnetic member 17 is engaged with the engaging part 11*b* of guide member 11. In other words, the magnetic member 17 that is mounted outside the guide member 11 from one side of the axial direction is in contact, at its inner edge part, with the engaging part 11*b* of the guide member 11.

Figure 2:
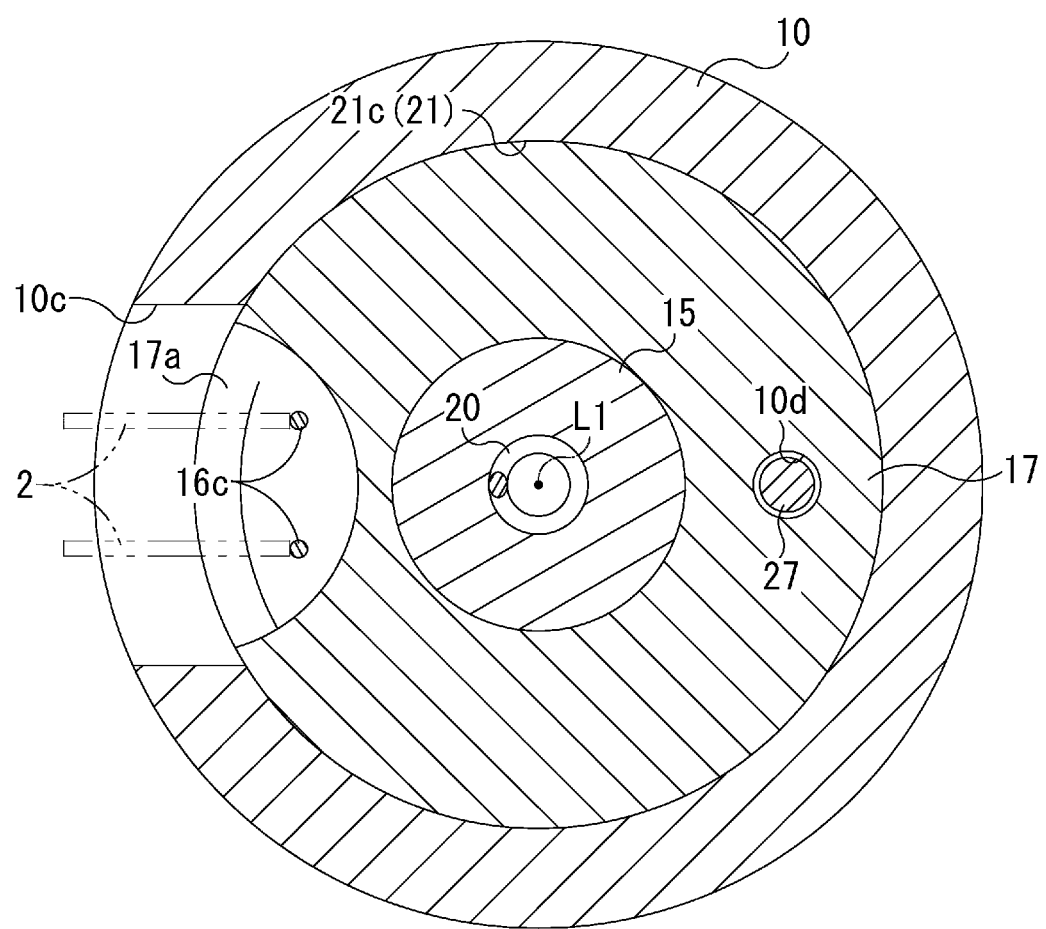
FIG. 2 is a sectional view showing the valve device cut along the cutting line II-II in FIG. 1.

Also, as shown in FIG. 2, the magnetic member 17 has a notch 17*a* at a position corresponding to the terminal 16*c* of the solenoid 16. The terminal 16*c* projects to the notch 17*a*. Also, the lateral face of the valve block 10 is formed with an extraction hole 10*c* at a position corresponding to the notch 17*a*. The extraction hole 10*c* connects with the insertion hole 21. More specifically, the extraction hole 10*c* connects with the notch 17*a*. As a result, the terminal 16*c* arranged in the notch 17*a* can be made to face with the extraction hole 10*c*. Also, the extraction hole 10*c* connects with the exterior of the valve block 10. Therefore, the energizing member 2 extends to the extraction hole 10*c* from the lateral side of the valve block 10. The energizing member 2 is, for example, wiring or a terminal. In the present embodiment, the energizing member 2 is a terminal. The energizing member 2 is connected with the terminal 16c. Thus, the energizing member 2 is capable of energizing the solenoid 16 via the terminal 16c. Since the energizing member 2 can be extracted from the extraction hole 10c as described above, it is possible to prevent the routing of the energizing member 2 from becoming complicated.

The casing 18, which is one example of the support member, accommodates the solenoid 16. More specifically, the casing 18 covers the part on one side of the axial direction of the solenoid 16. Also, the casing 18 supports the guide member 11 that receives pressure from the gas flowing at the time of opening of the valve port 24. Further, the casing 18, together with the magnetic member 17, constitutes a magnetic circuit. More specifically, the casing 18 is made of a magnetic material and formed into a cylindrical shape. The casing 18 has an inward flange 18a on the inner circumferential face. The inward flange 18a is formed away from the end part on one side of the axial direction of the casing 18 on the inner circumferential face. The casing 18 accommodates the solenoid 16 at a position closer to the other side of the axial direction than the inward flange 18a. The casing 18 is inserted in the insertion hole 21 in the state that the casing 18 accommodates the solenoid 16 and is sealed. Also, the distal end of the casing 18 is in contact with the outer edge part of the magnetic member 17.

The casing 18 is screwed with the valve block 10. Also, the casing 18 has a holding part 18b on one side of the axial direction on the outer circumferential face. The holding part 18b can be held by a jig for casing, such as a spanner. For example, the holding part 18b is formed into a polygon (hexagon in the present embodiment) viewed from one side of the axial direction. Therefore, by turning the casing 18 by holding the holding part 18b, it is possible to screw the casing 18 with the valve block 10. Also, by turning the casing 18, it is possible to push the casing 18 forward toward the step 21b. As a result, the casing 18 comes into contact with the magnetic member 17. Accordingly, the casing 18 supports the guide member 11 via the magnetic member 17 when the valve port 24 is opened.

The solenoid 16 has a positioning pin 27 so as to prevent the solenoid 16 and the magnetic member 17 from corotating when the casing 18 is turned. The positioning pin 27 which is a positioning part penetrates the magnetic member 17 from the solenoid 16 and projects to the other side of the axial direction. The step part 21b of the valve block 10 is formed with a positioning hole 10d at a position corresponding to the positioning pin 27. The positioning pin 27 is inserted in the positioning hole 10d. As a result, rotation of the solenoid 16 and the magnetic member 17 is inhibited.

The stationary pole 19, in cooperation with the solenoid 16, generates a magnetizing force against the biasing force of the second spring member 20 to move the main valve body 12. More specifically, the stationary pole 19 is a circular columnar member made of a ferromagnetic substance. A distal end part of the stationary pole 19 is inserted in the guide member 11 such that it is opposed to the plunger 15. Therefore, the plunger 15 that is magnetized by energization of the solenoid 16 can be adsorbed by the stationary pole 19. Accordingly, the seat piston 14 is lifted up. Thus, the main valve body 12 is separated from the valve seat 25 by the first spring member 13, and the first passage 22 opens. Also, the seat piston 14 is biased by the second spring member 20 arranged between the seat piston 14 and the stationary pole 19. Therefore, when the energization of the solenoid 16 is cancelled, the seat piston 14, together with the plunger 15, is pushed toward the main valve body 12 by the second spring member 20. Accordingly, it is possible to seat the seat piston 14 on the main valve body 12, and it is possible to seat the main valve body 12 on the valve seat 25 via the seat piston 14.

Also, a proximal end side part of the stationary pole 19 projects from the guide member 11 and the solenoid 16 toward one side of the axial direction. The proximal end side part of the stationary pole 19 is formed to have a larger diameter than a distal end side part. The proximal end side part of the stationary pole 19 forms a lid member 19a. The lid member 19a is inserted, at its part on one side of the axial direction, in the inward flange 18a of the casing 18, and screwed therewith. Further, the lid member 19a is in contact with the end part on one side of the axial direction of the solenoid 16.

The end part on one side of the axial direction of the lid member 19a, namely the end part on one side of the axial direction of the stationary pole 19 is formed with a hole for jig 19b for insertion of a jig for lid such as a hexagonal wrench. By inserting a jig for lid into the hole for jig 19b and turning the stationary pole 19, the stationary pole 19 is screwed with the casing 18. As a result, it is possible to close an opening part 18c on one side of the axial direction of the casing 18 by the lid member 19a. Also, by turning the stationary pole 19 to push it forward, it is possible to push the solenoid 16 against the magnetic member 17 by the lid member 19a.

In the valve device 1, the main valve body 12 is seated on the valve seat 25 to close the valve port 24. When the solenoid 16 is energized, the solenoid 16 and the stationary pole 19 cooperate to generate a magnetizing force to move the main valve body 12 to the closed position. More specifically, when the solenoid 16 is energized, the plunger 15 is adsorbed to the stationary pole 19. As a result, the seat piston 14 is lifted up against the biasing force of the second spring member 20. Accordingly, the main valve body 12 that is biased by the first spring member 13 moves to the open position, and the valve port 24 opens. As a result, the first passage 22 and the second passage 23 communicate with each other via the guide flow channel 11a of the guide member 11. On the other hand, when energization is suspended, the seat piston 14 is pushed together with the plunger 15 toward the main valve body 12 by the second spring member 20. As a result, the seat piston 14 is seated on the main valve body 12. Further, the second spring member 20 makes the main valve body 12 be seated on the valve seat 25 via the seat piston 14. As a result, the valve port 24 is closed, and the first passage 22 and the second passage 23 are disconnected from each other.

Figure 3:
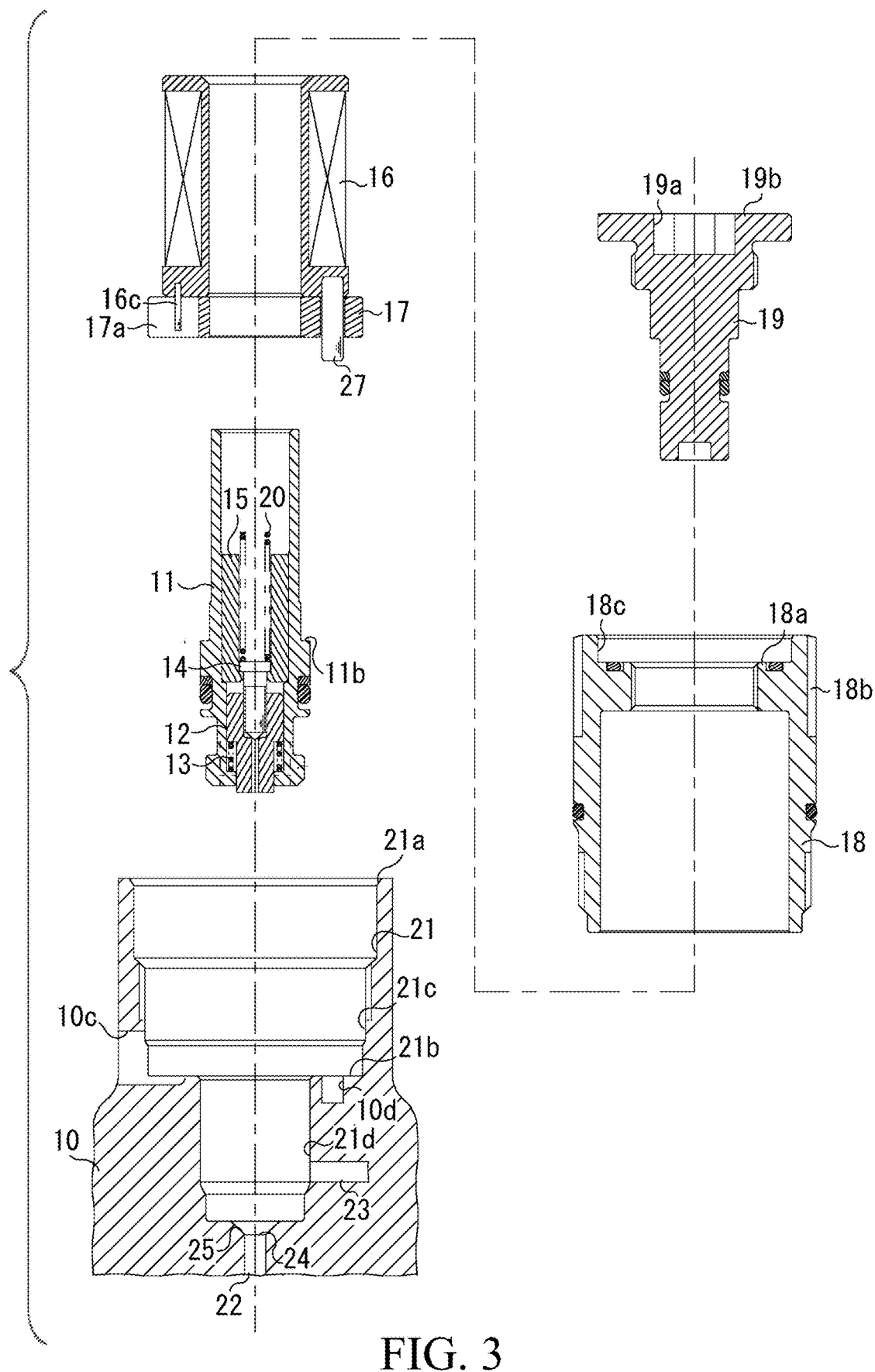
FIG. 3 is an exploded sectional view showing the valve device of FIG. 1 in an exploded manner.

The valve device 1 is constructed according to one example of a constructing method described below. That is, as shown in FIG. 3, the main valve body 12, the first spring member 13, the seat piston 14, and the plunger 15 and so on are assembled in the guide member 11. After the assembling, the guide member 11 is inserted in the small-diameter part 21d of the insertion hole 21 of the valve block 10. Next, the solenoid 16 and the magnetic member 17 are mounted outside the guide member 11. Then, the solenoid 16 and the magnetic member 17 are inserted in the large-diameter part 21c of the insertion hole 21. At this time, the solenoid 16 and the magnetic member 17 are positioned so that the positioning pin 27 enters the positioning hole 10d. After the positioning, the casing 18 is put over the solenoid 16. Then, the casing 18 is inserted in the large-diameter part 21c of the insertion hole 21. Further, the casing 18 is turned while the casing 18 is held by a jig for casing. As a result, the casing 18 is screwed with the valve block 10. Also, by turning the casing 18 to push it forward, the magnetic member 17 is pushed against the valve block 10 and fixed. Lastly, the stationary pole 19 is inserted in the solenoid 16 through the opening part 18c of the casing 18. Then, by turning the stationary pole 19 with a jig for lid, the stationary pole 19 is screwed with the solenoid 16. Also, by turning the stationary pole 19 to push it forward, the solenoid 16 is pushed against the magnetic member 17 by the stationary pole 19, and fixed. In this manner, the valve device 1 is constructed.

In the valve device 1, the casing 18 to which the lid member 19a is attached is screwed with the valve block 10. Therefore, there is no need to form a bolt hole for attaching the lid member 19a to the valve block 10. Therefore, it is possible to miniaturize the valve block 10, that is, it is possible to miniaturize the valve device 1. Also, since the stationary pole 19 also serves as the lid member 19a, it is possible to reduce the number of parts of the valve device 1.

Further, by covering the solenoid 16 and so on with the casing 18 and the lid member 19a, it is possible to make the casing 18 project from the valve block 10. Therefore, it is possible to reduce the height of the valve block 10. The valve block 10 is made of metal such as an aluminum alloy, for example. On the other hand, the casing 18 is made of a magnetic material. Therefore, by reducing the height of the valve block 10, it is possible to reduce the material cost and the processing cost. Also, by utilizing a projecting part of the casing 18 as the holding part 18b, it is possible to prevent upsizing of the casing 18. Also, formation of the holding part 18b in the casing 18 facilitates turning of the casing 18 by holding with a jig for casing. As a result, it is possible to easily screw the casing 18 with the valve block 10.

Embodiment 2

The valve device 1A of Embodiment 2 is similar to the valve device 1 of Embodiment 1 in configuration. Therefore, the configuration of the valve device 1A of Embodiment 2 is described mainly about the point different from that of the valve device 1 of Embodiment 1, and the same constitution is denoted by the same reference numeral, and the description is omitted.

Figure 4:
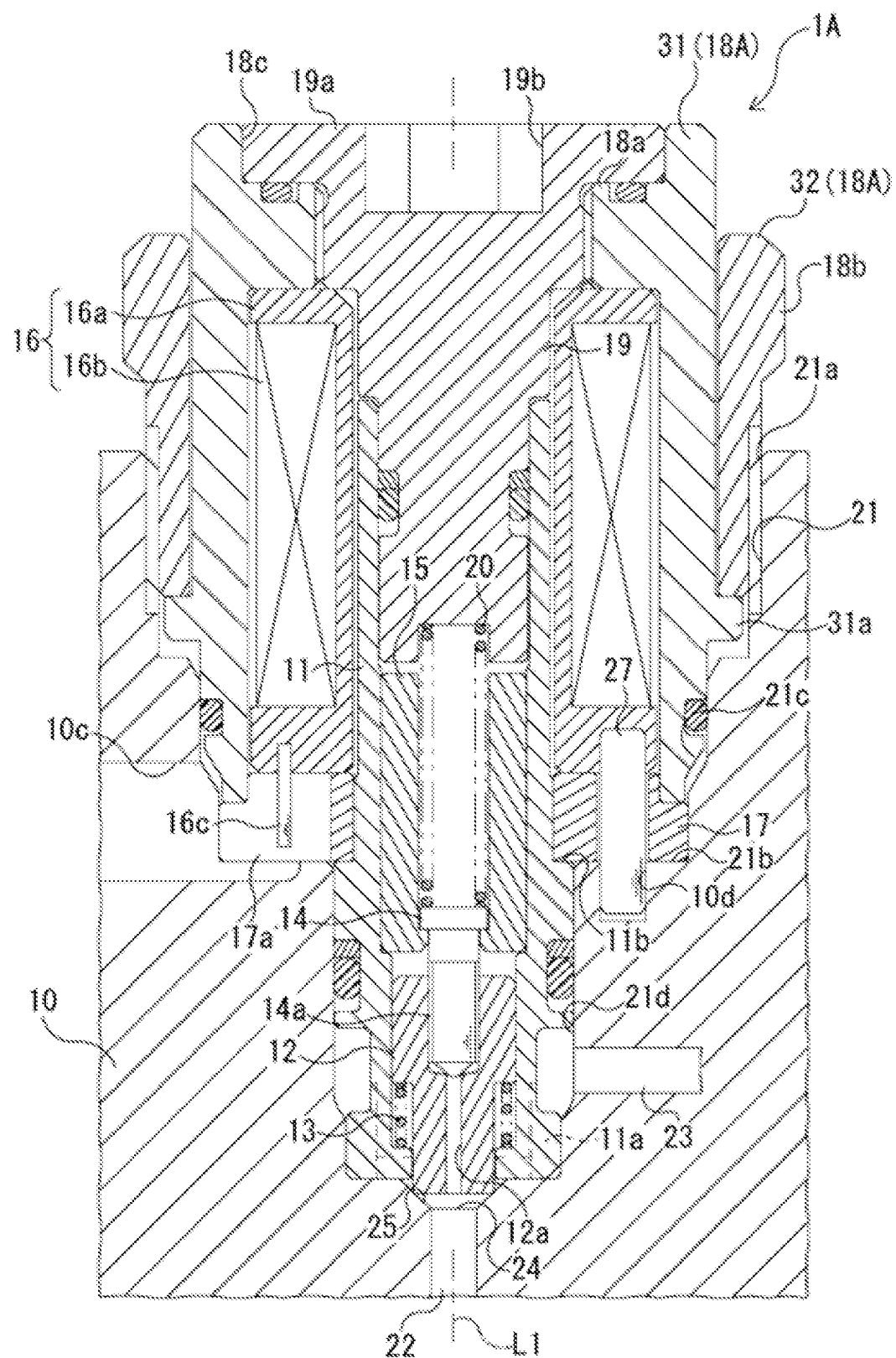
FIG. 4 is a sectional view of a valve device according to Embodiment 2 of the present invention.

As shown in FIG. 4, the valve device 1A of Embodiment 2 includes the valve block 10, the guide member 11, the solenoid 16, the magnetic member 17, a casing 18A, and the stationary pole 19. The valve device 1A also includes the main valve body 12, the first spring member 13, the seat piston 14, the plunger 15, and the second spring member 20.

The casing 18A, which is another example of the support member, is joined to the valve block 10 such that the casing 18A supports the guide member 11 that receives pressure from the gas flowing at the time of opening of the valve port 24. More specifically, the casing 18A has a casing body 31, and a fastening member 32. The casing body 31 resembles the casing 18 in configuration. That is, the casing body 31 is put over the one end side part of the solenoid 16 and accommodates the solenoid 16. More specifically, the casing body 31 is made of a magnetic material and formed into a cylindrical shape. The casing body 31 has an inward flange 18a on the inner circumferential face. The casing body 31 accommodates the solenoid 16 at a position closer to the other side of the axial direction than the inward flange 18a. Further, the casing body 31 is inserted in the insertion hole 21 in the state that the casing body 31 is sealed. The distal end of the casing body 31 is in contact with the outer edge part of the magnetic member 17. Further, the casing body 31 has an outward flange 31a on the outer circumferential face. The outward flange 31a is formed away from the other end part of the casing body 31 on the outer circumferential face.

The fastening member 32 fastens the casing body 31 to the valve block 10. More specifically, the fastening member 32 is formed into a cylindrical shape. The fastening member 32 is mounted outside the casing body 31. Also, the part on the other side of the axial direction of the fastening member 32 is inserted in the insertion hole 21 and screwed with the valve block 10. The distal end of the fastening member 32 is in contact with the outward flange 31a of the casing body 31. Further, the fastening member 32 has the holding part 18b on one side of the axial direction on the outer circumferential face. Therefore, by turning the fastening member 32 while holding the holding part 18b, it is possible to push the fastening member 32 forward. As a result, the fastening member 32 pushes the casing body 31 against the magnetic member 17 via the outward flange 31a. As a result, the casing body 31 is fastened to the valve block 10. In this manner, the casing 18A is screwed (joined) with the valve block 10.

The valve device 1A of Embodiment 2 exerts the same operation and effect as the valve device 1 of Embodiment 1.

Other Embodiments

The valve device 1 of the present embodiment is a pilot-type electromagnetic valve device in which the main valve body 12 is driven via the seat piston 14 and the plunger 15, however, the valve device 1 is not necessarily configured in this manner. That is, the main valve body 12 may be adsorbed to the stationary pole 19. Also, the second spring member 20 may bias the main valve body 12 toward the closed position. The casing 18 need not necessarily be screwed with the valve block 10. For example, the casing 18 may be welded to the valve block 10. The casing 18 need not necessarily project from the opening 21a of the valve block 10.

In the valve device 1, the proximal end side part of the stationary pole 19 constitutes the lid member 19a, however, a lid member may be configured separately from the stationary pole 19. Also, the lid member may be formed integrally with the casing 18. Also, positioning of the solenoid 16 with respect to the valve block 10 is not necessarily limited to the method using the positioning pin 27. For example, steps or a recess and a projection respectively corresponding to the step parts of the magnetic member 17 and the valve block 10 are formed. By engaging the steps or the recess and the projection that correspond to each other, it is possible to prevent the solenoid 16 from rotating together with the casing 18.

Various modifications and other embodiments of the present invention will be apparent to those skilled in the art from the above description. Accordingly, the above description should be interpreted merely as illustration, and is provided for the purpose of indicating the best mode for carrying out the present invention to those skilled in the art. The details of the structure and/or the function can be substantially changed without departing from the spirit of the present invention.

REFERENCE CHARACTERS LIST 1 valve device
2 energizing member
10 valve block
10c extraction hole
11 guide member 12 main valve body (valve body)
16 solenoid
18, 18A casing (support member)
18b holding part
19 stationary pole
19a lid member
20 second spring member (biasing member)
24 valve port
27 positioning pin (positioning part)
31 casing body
32 fastening member

The invention claimed is:

1. A valve device comprising:
a valve block having a valve port through which a fluid passes and an insertion hole;
a valve body that opens or closes the valve port;
a guide member that is inserted in the insertion hole, and slidably guides the valve body;
a solenoid that generates a magnetic field when energized;
a stationary pole that cooperates with the solenoid to move the valve body;
a magnetic member that is arranged in the insertion hole and constitutes a magnetic circuit together with the solenoid;
a support member that is tubular and inserted in the insertion hole to accommodate the solenoid, and supports the guide member that receives pressure from the fluid passing through the valve port; and
a lid member that is joined to an inner circumferential face of the support member and closes an opening of the support member, wherein
the support member is joined with the valve block,
the magnetic member has a notch,
the valve block has an extraction hole connecting with the notch located in the insertion hole, on a lateral face,
the solenoid has a terminal projecting to the notch and facing the extraction hole, and
in the extraction hole, an energizing member that is connected with the terminal to energize the solenoid extends from a lateral side of the valve block.

2. The valve device according to claim 1, wherein the stationary pole has the lid member.

3. The valve device according to claim 1, wherein the support member is joined with the valve block by screwing.

4. The valve device according to claim 1, wherein the support member projects, at a one end side part, from the insertion hole.

5. The valve device according to claim 3, wherein
the support member projects, at a one end side part, from the insertion hole, and
a holding part is formed on a lateral face of the one end side part of the support member.

6. The valve device according to claim 1, wherein the solenoid has a positioning part that positions the solenoid with respect to the valve block.

* * * * *